Jan. 20, 1925.

H. P. FORTE

CANDY PACKAGE

Filed Jan. 29, 1919

1,523,870

Witnesses:
Nelson H. Copp

INVENTOR
Harry P. Forté
BY
his ATTORNEYS

Patented Jan. 20, 1925.

1,523,870

UNITED STATES PATENT OFFICE.

HARRY P. FORTÉ, OF CANAJOHARIE, NEW YORK.

CANDY PACKAGE.

Application filed January 29, 1919. Serial No. 273,842.

*To all whom it may concern:*

Be it known that I, HARRY P. FORTÉ, of Canajoharie, in the county of Montgomery and State of New York, have invented certain new and useful Improvements in Candy Packages; and I do hereby declare the following to be a full, clear, and exact description of the same, reference being had to the accompanying drawings, forming a part of this specification, and to the reference numerals marked thereon.

My present invention relates mainly to confectionery and more particularly to the packaging of products of the nature of hard candy that are offered in the form of tablets or lozenges, and it has for its object to provide an improved package or measure of such candy products that can be easily prepared by the manufacturer but which holds the individual pieces spaced from each other so that they will not stick together when warm or damp. To these and other ends the invention resides in certain improvements and combinations of parts, all as will be hereinafter more fully described, the novel features being pointed out in the claim at the end of the specification.

In the drawings.

Similar reference numerals throughout the several views indicate the same parts.

Figure 1:
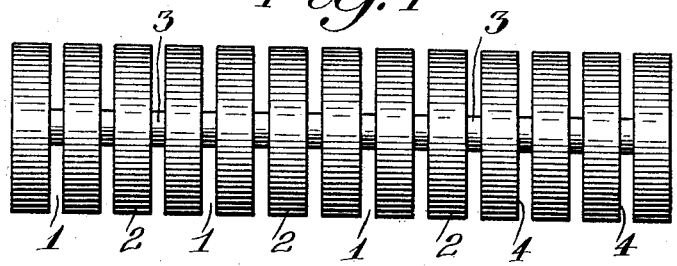
Figure 1 is a side view of the candy preparation formed in accordance with and illustrating one embodiment of my invention.

By "hard" candies, I refer to the crystalline, frangible confection usually formed in drops or lozenges, as in the case of cough drops. It has heretofore been the practice, when it was desired to carefully pack these, to dust them with sugar or place them in individual wrappings to prevent adhesion. Such methods add to the expense and also make packaging more difficult. In the practice of my invention, I first form the candy or other material in a preferably cylindrical stick and then cut or press deep transverse grooves 1 therein at uniform intervals, as shown in Figure 1, to separate the stick into a plurality of tablets 2 having their side faces disposed toward each other. This partially severs the stick at the points mentioned, but leaves a small connecting stem 3 at or near the centers of the tablets that spaces them from each other and holds their opposed side faces, indicated at 4, from contact with anything. To detach one of the tablets from the others, it is only necessary to press in a longitudinal or axial direction against its edge. The rocking or tilting strain that results fractures the connecting stem 3, the leverage being great and the stem relatively fragile.

Figure 2:
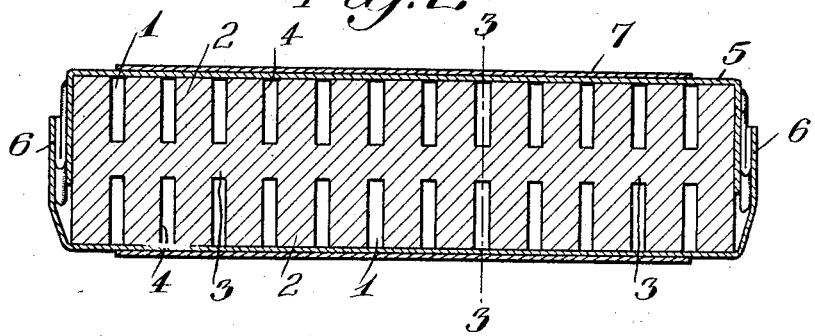
Figure 2 is a longitudinal central view of the complete package.
Figure 3:
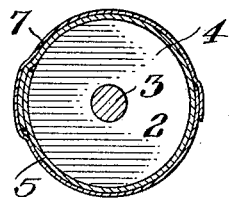
Figure 3 is a transverse section on the line 3—3 of Figure 2.

The group or series of tablets is readily handled and counted in packing and in Figure 2, I have shown it rolled in a tinfoil wrapper 5, crimped at the ends as shown at 6, and enclosed by an outer covering of paper 7 that may be in the form of an appropriate label. When so wrapped, the candy is protected against accidental fracturing of the stems 3 by lateral blows or strains, for the reason that the wrapping supports the edges of the tablets and in a great measure, takes the strain from the center where the fragile stems are located. Thus, in opening the package by unfolding or tearing the crimping 6 of one end, the tablets may be detached one at a time by applying the tilting pressure to the outer one while the inner ones are still supported by the wrappings.

Also in the package of Figure 2, should one or more of the stems 3 become fractured, the package would still maintain its shape and the tablets adjacent the fracture would ordinarily maintain their relationship for the stem would still act to space them at the center and the coverings 5 and 7 at the edges would hold the fractured parts in place.

I claim as my invention:

A confection comprising a plurality of axially aligned bodies having their opposed walls flattened and each having its thickness less than its diameter, and centrally arranged fragile and thread like connections formed of the same material as the bodies, and spacing the flat faces of the bodies each thread like connection breaking when pressure is applied at one side of the outermost flat face of each body.

HARRY P. FORTÉ.